(12) United States Patent
Panchalan et al.

(10) Patent No.: US 8,823,493 B2
(45) Date of Patent: Sep. 2, 2014

(54) DEVICES EMPLOYING MODULATOR SWITCHING AND METHODS THEREOF

(75) Inventors: Prasad Panchalan, San Jose, CA (US); Edward M. Farrell, Saratoga, CA (US)

(73) Assignee: Intelleflex Corporation, San Jose, CA (US)

( * ) Notice: Subject to any disclaimer, the term of this patent is extended or adjusted under 35 U.S.C. 154(b) by 916 days.

(21) Appl. No.: 12/814,095

(22) Filed: Jun. 11, 2010

(65) Prior Publication Data

US 2011/0304432 A1    Dec. 15, 2011

(51) Int. Cl.
*H04L 17/10*    (2006.01)
*H04Q 5/22*    (2006.01)

(52) U.S. Cl.
USPC ............... 340/10.1; 340/10.5; 235/451

(58) Field of Classification Search
CPC ............ H04L 27/10; H04Q 5/22; H03D 1/00; G06K 7/08
USPC ............ 455/73, 78; 235/451; 375/239; 340/10.1–10.5
See application file for complete search history.

(56) References Cited

U.S. PATENT DOCUMENTS

| | | | |
|---|---|---|---|
| 4,335,468 A * | 6/1982 | Foster et al. ............ | 455/501 |
| 5,731,781 A * | 3/1998 | Reed ...................... | 342/135 |
| 6,353,406 B1 * | 3/2002 | Lanzl et al. ............ | 342/118 |
| 6,456,668 B1 * | 9/2002 | MacLellan et al. ....... | 375/283 |
| 6,801,784 B1 * | 10/2004 | Rozenblit et al. ........ | 455/522 |
| 6,812,824 B1 * | 11/2004 | Goldinger et al. ....... | 340/10.1 |
| 6,819,938 B2 * | 11/2004 | Sahota .................... | 455/522 |
| 7,155,172 B2 * | 12/2006 | Scott ...................... | 455/70 |
| 7,526,266 B2 * | 4/2009 | Al-Mahdawi ............ | 455/296 |
| 7,734,270 B2 * | 6/2010 | Wong ...................... | 455/296 |
| 7,773,945 B2 * | 8/2010 | Reynolds ................ | 455/41.3 |
| 7,822,388 B2 * | 10/2010 | Yamasaki ................ | 455/73 |
| 8,120,465 B2 * | 2/2012 | Drucker .................. | 340/10.1 |
| 8,120,466 B2 * | 2/2012 | Mutti ...................... | 340/10.1 |
| 8,226,003 B2 * | 7/2012 | Frederick et al. ........ | 235/451 |
| 8,351,490 B2 * | 1/2013 | Chen et al. ............. | 375/219 |
| 8,559,486 B2 * | 10/2013 | Kitayoshi ................ | 375/219 |

* cited by examiner

*Primary Examiner* — Nam V Nguyen
(74) *Attorney, Agent, or Firm* — Zilka-Kotab, PC

(57) ABSTRACT

In one embodiment, a RFID reader circuit includes a RF source input in a transmitting path, a RF modulator in parallel with a bypass, the RF modulator and the bypass being selectively coupled to the RF source input, at least one switch for selectively coupling an output of the RF modulator to the transmitting path, and a RF power amplifier in the transmitting path. In another embodiment, a RFID system includes a plurality of RFID tags, and a RFID reader, the RFID reader comprising a RFID reader circuit. The circuit includes a RF source input in a transmitting path, a RF modulator in parallel with a bypass, the RF modulator and the bypass being selectively coupled to the RF source input, at least one switch for selectively coupling an output of the RF modulator to the transmitting path, and a RF power amplifier in the transmitting path.

31 Claims, 13 Drawing Sheets

DEVICES EMPLOYING MODULATOR SWITCHING AND METHODS THEREOF

FIELD OF THE INVENTION

The present invention relates to Radio Frequency (RF) devices and methods, and more particularly, this invention relates to Radio Frequency Identification (RFID) devices using delay matching techniques to mitigate noise.

BACKGROUND OF THE INVENTION

The use of Radio Frequency Identification (RFID) tags are quickly gaining popularity for use in the monitoring and tracking of items. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID reader, which is capable of reading the tag. This coupling is advantageous, as it precludes the need for a direct contact or line of sight connection between the tag and the reader.

In some currently used passive and semi-passive RFID tags, during the 'read' cycle, the reader generally transmits a continuous unmodulated carrier signal. A distant RFID tag includes a RF switch connected to the tag's antenna, which repetitively alternates its state at a rate called the 'backscatter link frequency.' This RF switch effectively modulates the carrier signal received from the transmitter, creating sidebands within the tag surrounding the carrier frequency, and separated from the carrier frequency by the backscatter link frequency. These sidebands are re-radiated by the tag's antenna, and are recovered by the reader. The above description is one typical way in which the tag communicates information to the reader. The tag does not create RF power, but instead modulates incoming RF power from the reader's transmitter, and in so doing, converts some of that incoming power to sideband frequencies which can be separately recovered by the reader. These backscatter sidebands only exist when (and because) the reader is transmitting.

In some readers, the antenna configuration is 'monostatic' which means that the sidebands created by the distant tag are recovered via the same antenna that the reader's transmitter uses to transmit the carrier signal. In a monostatic reader, a power amplifier is connected to a signal splitter, which is connected to an antenna and a low noise amplifier. In some other readers, the antenna configuration is 'bistatic' which means that the sidebands created by the distant tag are recovered by the reader via a separate antenna. A bistatic reader differs from a monostatic reader in that each reader has a power amplifier, low noise amplifier, and antenna, but in the bistatic reader, the power amplifier is connected directly to a transmit antenna, a separate receive antenna connects directly to the low noise amplifier, and there is no signal splitter.

In some RFID reader configurations, interference can occur between the sending and receiving portions of the reader. This can be influenced by a number of different factors, but inevitably results in degradation of the reader's receiver sensitivity. Therefore, systems and methods which alleviate this problem would be particularly beneficial to the field of RFID readers and tags, as well as other RF systems employing backscatter communications.

SUMMARY OF THE INVENTION

In one embodiment, a Radio Frequency Identification (RFID) reader circuit includes a Radio Frequency (RF) source input in a transmitting path, a RF modulator in parallel with a bypass, the RF modulator and the bypass being selectively coupled to the RF source input, at least one switch for selectively coupling an output of the RF modulator to the transmitting path, and a RF power amplifier in the transmitting path.

In another embodiment, a RFID system includes a plurality of RFID tags, and at least one RFID reader, the at least one RFID reader comprising a RFID reader circuit. The circuit includes a RF source input in a transmitting path, a RF modulator in parallel with a bypass, the RF modulator and the bypass being selectively coupled to the RF source input, at least one switch for selectively coupling an output of the RF modulator to the transmitting path, and a RF power amplifier in the transmitting path.

According to another embodiment, a RFID reader circuit includes a RF source in a transmitting path, a RF power amplifier in the transmitting path, a low noise amplifier in a receiving path, a first RF bandpass filter coupled between the RF source and a mixer module, a second RF bandpass filter in the receiving path coupled to the mixer module, a RF modulator selectively coupled to the RF source, and a switch in series with the RF modulator for selectively coupling a RF modulator output to the transmitting path. The mixer module multiplies a first signal from the first RF bandpass filter with a second signal from the second RF bandpass filter to recover the backscatter sidebands in the second signal.

Any of these embodiments may be implemented in an RFID system, which may include an RFID tag and/or interrogator.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
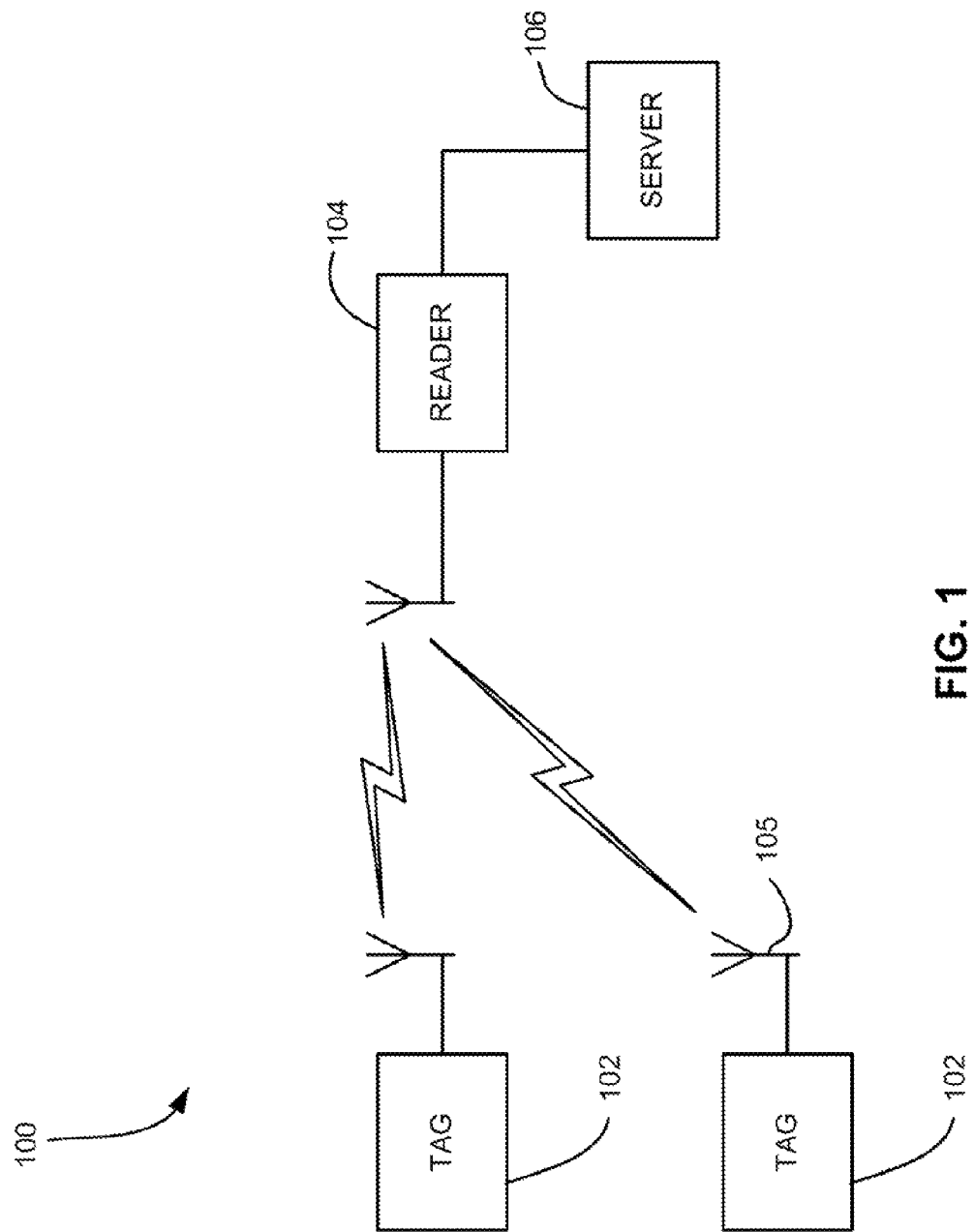
FIG. 1 is a system diagram of an RFID system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In the drawings, like and equivalent elements are numbered the same throughout the various figures.

In one general embodiment, a Radio Frequency Identification (RFID) reader circuit includes a Radio Frequency (RF) source input in a transmitting path, a RF modulator in parallel with a bypass, the RF modulator and the bypass being selectively coupled to the RF source input, at least one switch for selectively coupling an output of the RF modulator to the transmitting path, and a RF power amplifier in the transmitting path.

In another general embodiment, a RFID system includes a plurality of RFID tags, and at least one RFID reader, the at least one RFID reader comprising a RFID reader circuit. The circuit includes a RF source input in a transmitting path, a RF modulator in parallel with a bypass, the RF modulator and the bypass being selectively coupled to the RF source input, at least one switch for selectively coupling an output of the RF modulator to the transmitting path, and a RF power amplifier in the transmitting path.

According to another general embodiment, a RFID reader circuit includes a RF source in a transmitting path, a RF power amplifier in the transmitting path, a low noise amplifier in a receiving path, a first RF bandpass filter coupled between the RF source and a mixer module, a second RF bandpass filter in the receiving path coupled to the mixer module, a RF modulator selectively coupled to the RF source, and a switch in series with the RF modulator for selectively coupling a RF modulator output to the transmitting path. The mixer module multiplies a first signal from the first RF bandpass filter with a second signal from the second RF bandpass filter to recover the backscatter sidebands in the second signal.

FIG. 1 depicts an RFID system 100 according to one of the various embodiments, which may include some or all of the following components and/or other components. As shown in FIG. 1, one or more RFID tags 102 are present. Each RFID tag 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID tags 102 will be described as including a chip. Each RFID tag 102 may further include or be coupled to an antenna 105.

An illustrative chip is disclosed below, though actual implementations may vary depending on how the tag is to be used. In general terms, a preferred chip includes one or more of a power supply circuit to extract and regulate power from the RF reader signal; a detector to decode signals from the reader; a backscatter modulator to send data back to the reader; anti-collision protocol circuits; and at least enough memory to store its unique identification code, e.g., Electronic Product Code (EPC).

While RFID tags 102, according to some embodiments, are functional RFID tags, other types of RFID tags 102 include merely a controller with on-board memory, a controller and external memory, etc.

Each of the RFID tags 102 may be coupled to an object or item, such as an article of manufacture, a container, a device, a person, etc.

With continued reference to FIG. 1, a remote device 104, such as an interrogator or "reader," communicates with the RFID tags 102 via an air interface, preferably using standard RFID protocols. An "air interface" refers to any type of wireless communications mechanism, such as the radio-frequency signal between the RFID tag and the remote device (reader). The RFID tag 102 executes the computer commands that the RFID tag 102 receives from the reader 104.

The system 100 may also include an optional backend system such as a server 106, which may include databases containing information and/or instructions relating to RFID tags and/or tagged items.

As noted above, each RFID tag 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:
1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID tag 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the tag, no batteries are necessary. In systems where distance prevents powering a tag in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID tag and a remote device, e.g., reader, typically begins with the remote device, e.g., reader, sending out signals via radio wave to find a particular RFID tag via singulation or any other method known in the art. The radio wave hits the RFID tag, and the RFID tag recognizes the remote device's signal and may respond thereto. Such response may include exiting a hibernation state, sending a reply, storing data, etc.

Figure 2:
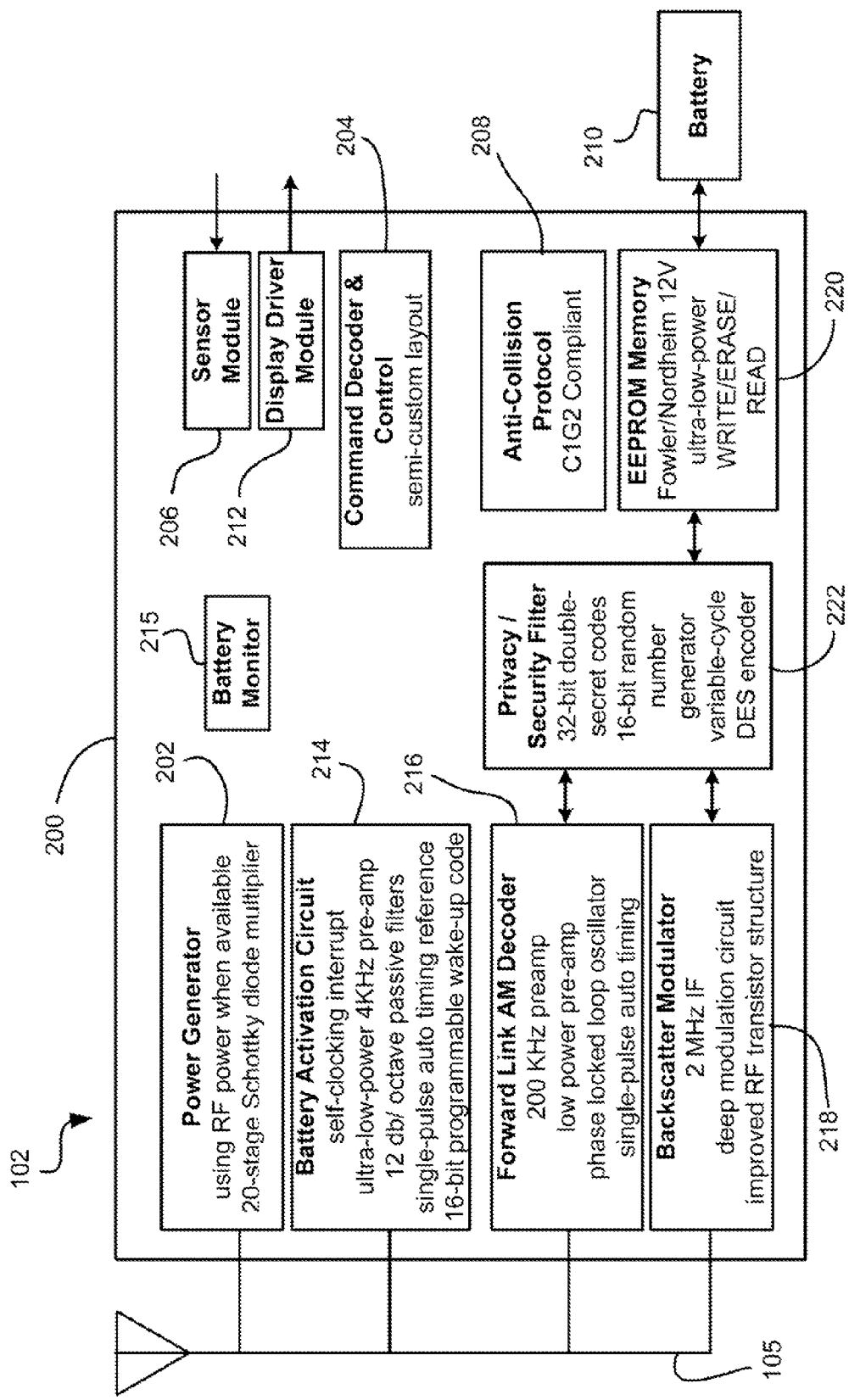
FIG. 2 is a system diagram for an integrated circuit (IC) chip for implementation in an RFID tag, in one embodiment.

Embodiments of the RFID tag are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID tag, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 $\mu$A/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device, e.g., reader.

The module 200 may also incorporate a security encryption circuit 222 for operating under one or more security schemes, secret handshakes with readers, etc.

The RFID tag may have a dedicated power supply, e.g. battery; may draw power from a power source of the electronic device (e.g., battery, AC adapter, etc.); or both. Further, the RFID tag may include a supplemental power source. Note that while the present description refers to a "supplemental" power source, the supplemental power source may indeed be the sole device that captures energy from outside the tag, be it from solar, RF, kinetic, etc. energy.

Fast Carrier Cancellation

Illustrative carrier signal frequencies correspond to those noted above in the description of the illustrative RFID tags. By way of example, assume a typical carrier signal produced by a RFID reader is about 900 MHz. Typically, the RFID tag signal is sent at an offset due to modulation, e.g., 288 KHz, rendering sidebands of 900 MHz±288 KHz. Thus, the RFID tag signal coming back is not the same as the signal being emitted by the RFID reader, and can be detected by the reader. However, the receiver is literally swamped with unwanted signals, making it difficult to discern the modulations of the incoming RFID tag signal from the multitude of incoming signals.

Figure 3:
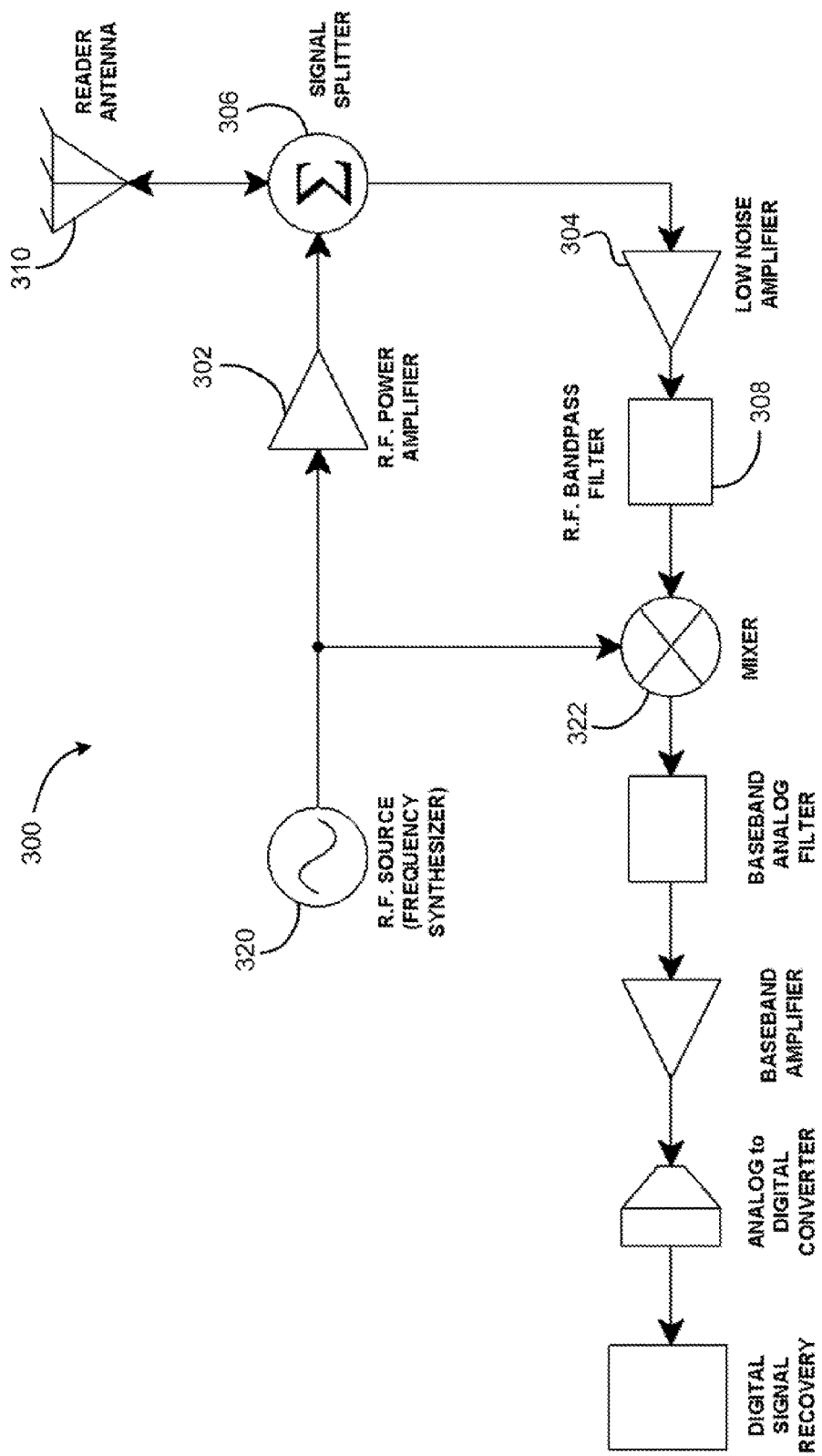
FIG. 3 is a partial block diagram of a RFID reader circuit according to one embodiment.

Referring to FIG. 3, one fairly apparent problem with monostatic RFID reader designs 300, and some bistatic RFID reader designs, is that the transmitter signal may be many times greater than any received backscattered signal from one or more RFID tags. Therefore, the large transmitter signal may impinge directly upon the low noise amplifier 304. The strength of this transmitter signal may approach the full transmitter power, depending upon the power sharing ratio defined in the signal splitter 306. This strong signal tends to overload the low noise amplifier 304 and mixer 322, rendering them incapable of performing their functions. In some embodiments, this issue may be addressed by extracting a portion of the transmit signal before the signal splitter 306, adjusting the amplitude and phase of this extract so as to mimic that fraction of the transmit signal which returns via the splitter 306, and then combining this modified extract with the splitter signal, out of phase, so as to cancel the splitter signal.

Figure 4A:
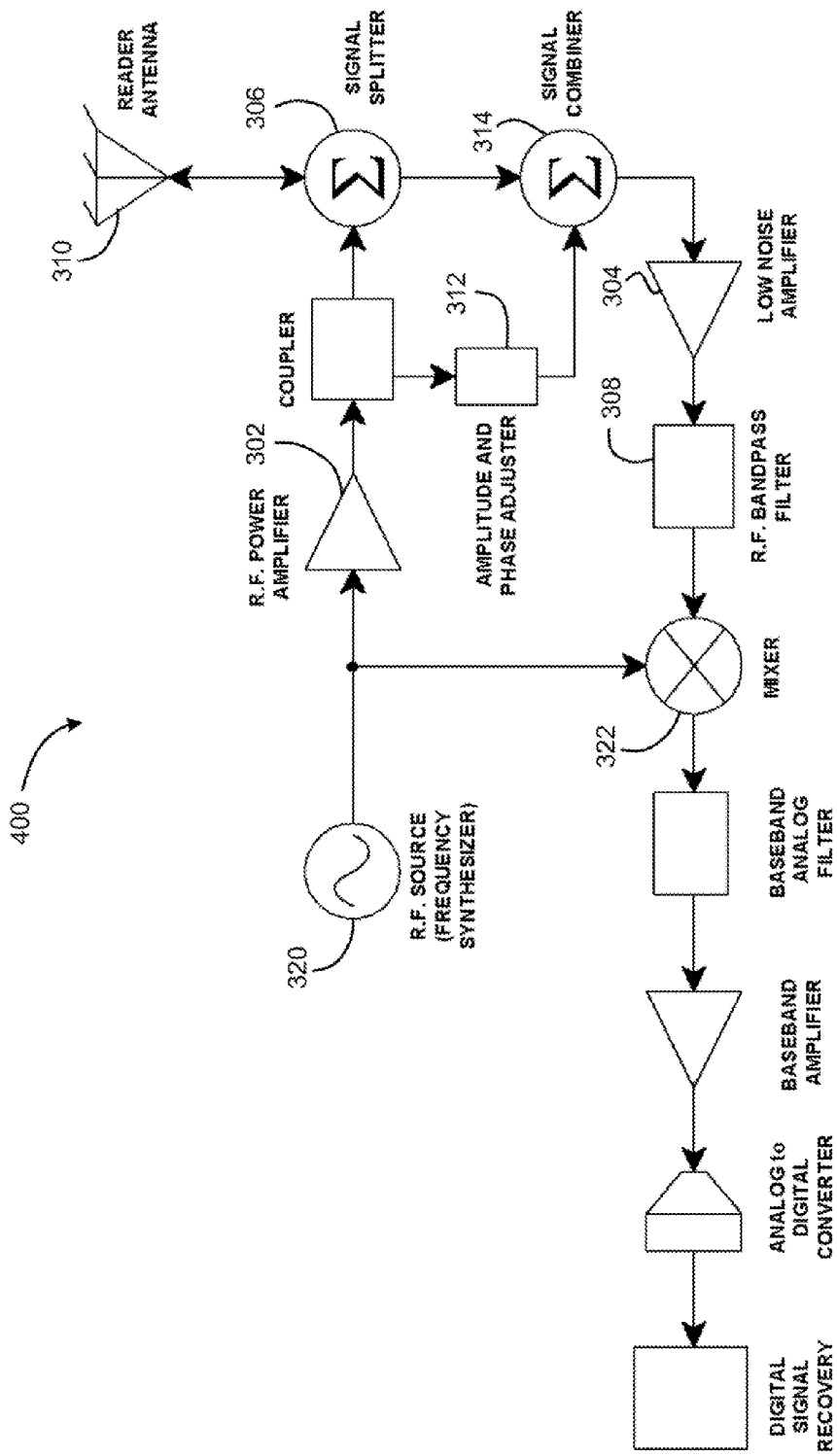
FIG. 4A is a partial block diagram of a RFID reader circuit according to one embodiment.
Figure 4B:
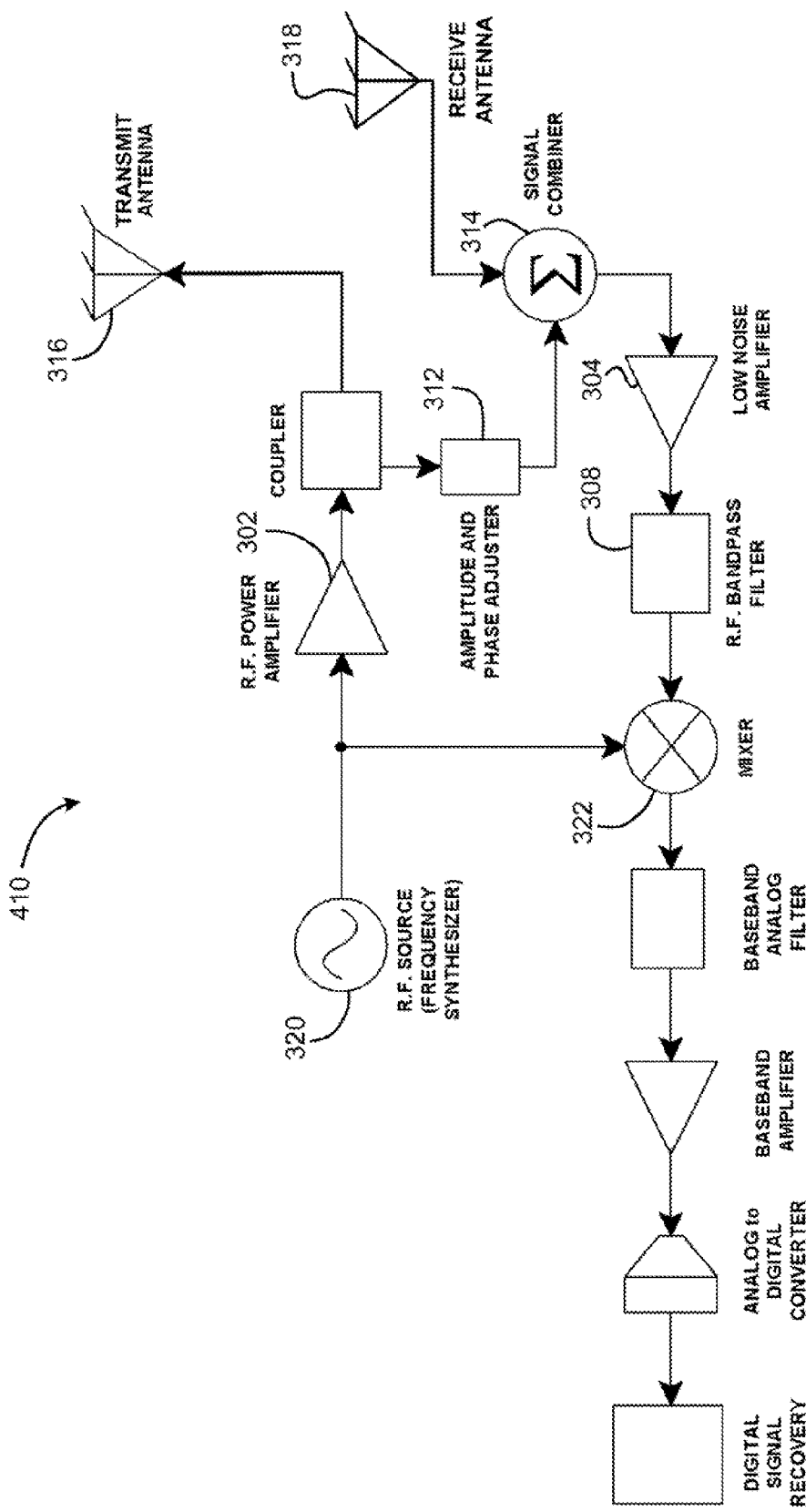
FIG. 4B is a partial block diagram of a RFID reader circuit according to another embodiment.

As shown in FIGS. 3-4B, new RFID reader designs solve some of the problems associated with prior art RFID readers, and particularly in dealing with the noise generated by the large transmitter. A partial block diagram of a monostatic RFID reader circuit is shown in FIG. 3 without an effective carrier cancellation, and with an effective carrier cancellation in FIGS. 4A-4B, according to several embodiments. Various embodiments of the present invention address these previously described issues by extracting a portion of the transmit signal before the signal splitter 306, adjusting the amplitude and phase of this extract using an amplitude and phase adjuster 312 so as to mimic that fraction of the transmit signal which returns via the signal splitter 306, and then combining this modified extract with the splitter signal using a signal combiner 314, out of phase, so as to cancel the splitter signal. This configuration is described in FIGS. 4A-4B, as compared to FIG. 3 which does not use this cancellation configuration. Note that FIG. 4A shows an illustrative monostatic configuration, while FIG. 4B shows an illustrative bistatic configuration.

The detection of the incoming carrier content (as opposed to the desired RFID tag response) may be performed by dynamically performing coherent I-Q detection of the received signal and averaging the detected I and Q over a period of time to detect the amount of the coherent carrier content in the received signal. In one embodiment, vectors formed by I and Q, which are references generated within the receiver, provides the amount of the carrier present in the received signal. Now that the level of the carrier present in the signal has been determined based on the DC signal, the carrier noise in the input signal can be cancelled.

Figure 5:
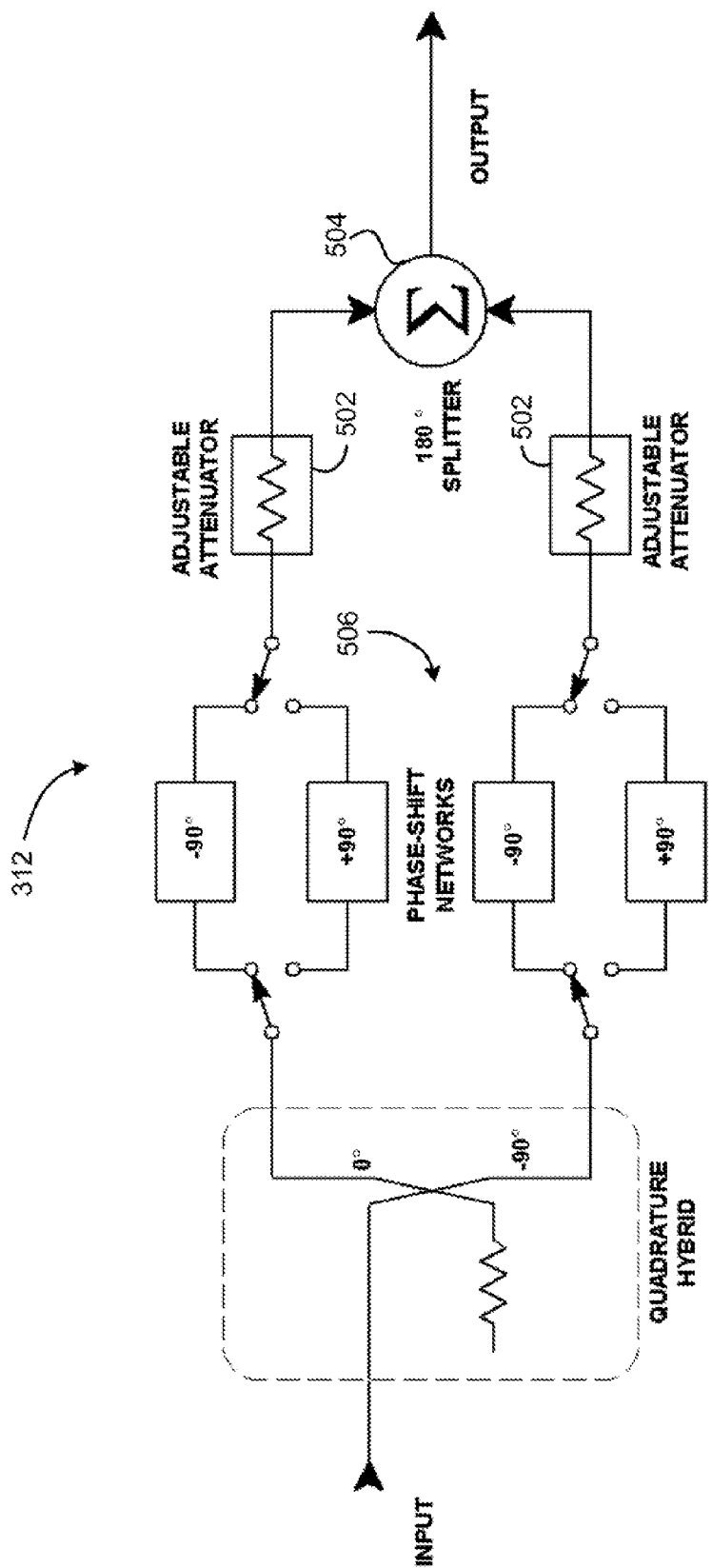
FIG. 5 is a block diagram of an amplitude and phase adjustor circuit according to one embodiment.

The heart of a carrier cancellation system, according to one embodiment, is the amplitude and phase adjuster 312, an illustrative embodiment of which is described in FIG. 5, according to one embodiment. By properly manipulating the switches of the phase shift networks 506 and attenuators 502, the carrier extract may be adjusted to any phase and amplitude which may be needed to cancel the splitter signal, according to one approach.

In some approaches, the implementation and exploitation of the amplitude and phase adjuster 312 may be altered to suit particular uses and subtleties of the RFID reader. Not preferred for use in the amplitude and phase adjuster are active analog attenuators, which by their nature suffer from inherently high internal shot noise levels and slow settling time. This shot noise greatly exceeds the thermal noise floor in most implementations, and the excess noise is injected directly into the reader receiver's input port, thus significantly degrading the receiver's sensitivity. As shown in FIG. 5, by using digital attenuators 502, which produce no shot noise, instead of the analog attenuators, the reader sensitivity is not negatively affected by the functioning of the attenuators 502.

Also, as previously described, analog attenuators take time before they can operate effectively, e.g., they need time to settle to a final attenuation setting. In the prior art, much of the time required to determine the correct attenuation setting is consumed in the settling time required by the analog attenuators themselves. Thus, the overall carrier cancellation procedure was very slow, which made it infeasible to perform the carrier cancellation procedure as frequently as it should have been performed. The carrier cancellation that was achieved, (e.g., only at power-up) was considered a compromise which is applied to all frequencies broadly, instead of determining an attenuation setting that more precisely applied to the actual operating conditions. In the case of hand-held readers, the optimum attenuation settings will vary widely with the location and orientation of the reader, which generally change in very short time periods while the reader is being operated, e.g., every time a read is performed. This effectively renders a single initial attenuation setting to be a poor approximation in the actual operating conditions. Poor or mediocre carrier cancellation causes degradation of the reader's receiver sensitivity.

Figure 6:
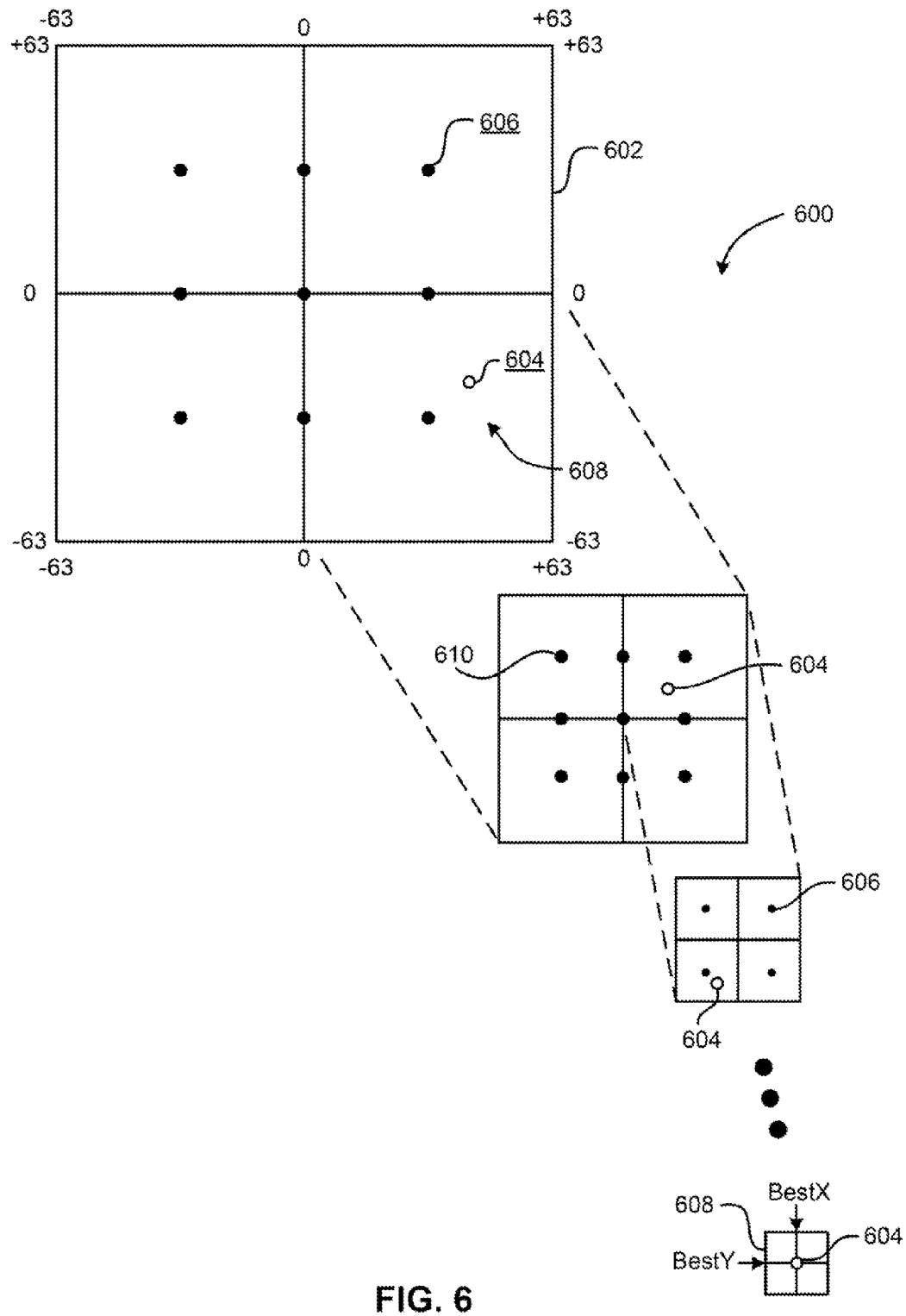
FIG. 6 is a representation of a method for determining an optimum attenuator setting, according to one embodiment.
Figure 7:
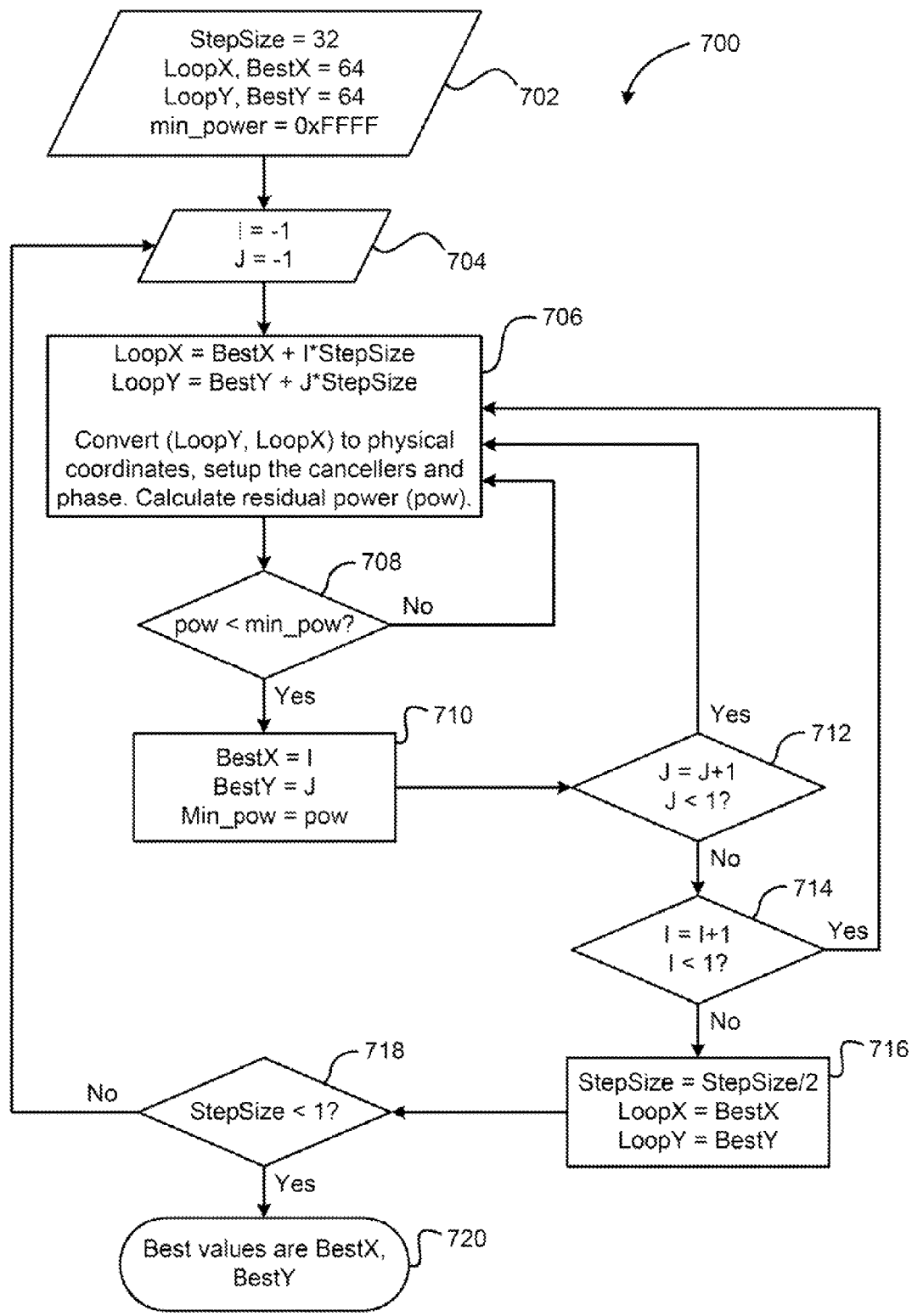
FIG. 7 is a flowchart of a method for determining an optimum attenuator setting, according to one embodiment.

Using digital attenuators 502 in the amplitude and phase adjustor 312 allows very rapid settling times (which may be essentially equal to the switching time of the switches within the digital attenuators 502). This results in a custom carrier cancellation procedure that may be performed on every RFID transaction, e.g., series of communications with a single device or tag. The cancellation procedure, in one approach, is a directed convergence process in which a low-level sidetone modulation (introduced into the reader's transmit signal at the beginning of the RFID transaction for this specific purpose) is monitored by the RFID receiver. The adjustable attenuators 502 are adjusted under the control of a convergence algorithm, as shown in FIGS. 6-7 in several embodiments, whose objective is to minimize the recovered sidetone by the receiver. The high-speed settling capability associated with digital attenuators permits this cancellation algorithm to be executed rapidly, allowing the cancellation to be refreshed for every RFID transaction, a vast improvement over the prior art.

Now referring to FIGS. 6-7, the convergence algorithm is described according to several embodiments. FIG. 6 shows a graphical representation of the convergence algorithm according to one embodiment, while FIG. 7 shows a flowchart of the convergence algorithm, according to one embodiment.

In FIG. 6, a method 600 of determining good or optimum attenuator settings is shown, according to one embodiment. The method may be carried out in any desired environment, including those described in FIGS. 1-5. Of course, more or less operations may be carried out as part of the method 600, in various embodiments. Also, the optimum settings (BestY, BestX) 604 are not generally known before performing the method 600, otherwise there would be little reason to determine them. Therefore, the representation of the optimum settings (BestY, BestX) 604 in the first few distributions is for explanation purposes only.

The digital attenuators in this illustrative embodiment are represented as having 63 positive states, 63 negative states, and a 0 setting. This can be viewed as a 64 state attenuator with settings for positive and negative values (+/−), as corresponding to the setting of the associated phase shift network (506, FIG. 5). Of course, any digital attenuators may be used, as would be known to one of skill in the art, and may include more or less states, such as 16 states, 32 states, 128 states, 256 states, etc.

Upon an event, such as after a start of transmission of a carrier signal, an initial distribution 602 is taken, with a predetermined number of settings 606 (2 or more, e.g., 2, 3, 4, 5, 9, 12, 13, etc.) applied at midpoints in the positive and negative axes, with the results being compared to determine which produces a best result. In FIG. 6, of the 9 settings that were applied, the best results are obtained for a setting taken from the middle of the lower right quadrant 608, which is indicated in FIG. 6 as having the (as yet unknown) optimum settings (BestY, BestX) 604. This quadrant 608 includes attenuator states from 0 to +63 in the x-direction, and 0 to −63 in the y-direction.

After a quadrant is chosen which is believed to include the optimum settings (BestY, BestX) 604, a new distribution is produced having only the corresponding (y, x) value ranges included. Nine settings 610 are applied from the new quadrant range, with the results again being compared. Since the middle value has already been calculated in the prior distribution, only eight additional calculations are performed in this process. After comparing the results of applying the settings, another quadrant is chosen which includes the optimum settings (BestY, BestX) 604.

This process is repeated with smaller and smaller distribution sizes for a predetermined number of cycles or until the optimum settings (BestY, BestX) 604 are determined, as shown in distribution 608, which corresponds to a selection of a state in the x-direction and a state in the y-direction.

In other approaches, distributions other than quadrants may be used, such as halves, thirds, etc. By using an iterative approach where samples of larger sets of settings are taken and compared, the system is able to quickly converge to a good or optimum setting.

The foregoing process can obtain the optimum settings in less than about 10 milliseconds (ms), more preferably less than about 5 ms. This ultra-fast determination allows the good or optimum attenuator settings to be determined for each transaction. Moreover, where regulations limit the transmission time of an RFID reader, ultrafast determination is critical to enabling the determination for each transaction. The foregoing process is believed to be able to obtain the optimum attenuator settings 4 ms or less where a 900 MHz carrier signal is used. Of course where less determination time is desired or required, e.g., by regulation, a few cycles can be performed to determine a setting that is close to the optimum setting.

Now referring to FIG. 7, a method 700 for determining optimum attenuator settings is shown according to another embodiment. The method 700 may be carried out in any desired environment, including those described in FIGS. 1-6. Of course, more or less operations may be carried out as part of the method 700, in various embodiments.

Method 700 is shown using 64-state digital attenuators, and thus the calculations and variables are all applicable for this type of attenuator. Of course, as would be known to one of skill in the art, any digital attenuators may be used, and may include more or less states, such as 16 states, 32 states, 128 states, 256 states, etc. The calculations and variables presented below may be adjusted appropriately to account for the different type of attenuator used, in other embodiments. However, for sake of clarity, only a 64-state attenuator will be represented in the following description of method 700.

Method 700 is an iterative method, and therefore incorporates an increment counter to account for performing the number of iterations to arrive at the good or optimum solution.

In operation 702, data is introduced for performing calculations. For a 64-state attenuator, a StepSize is set at 32, and the variables LoopX and BestX are set at 64. Similarly, the variables LoopY and BestY are set to 64. Min_power is set at 0xFFFF in hexidecimal format. A correlation may be drawn between method 600 and method 700, in that both methods attempt to find the optimum attenuator settings (BestY, BestX).

In operation 704, two variables, I and J, are set to −1. Variables I and J are set up as loop counters that define the boundaries of the area of interest, and in conjunction with the StepSize, enables the loop that sweeps the area of interest, according to one approach. Of course, other methods may be used to perform this functionality, and the invention is not meant to be limited to this particular embodiment, as many other feasible methods of performing iterative processes are available to one of skill in the art.

In operation 706, two calculations are performed, according to one embodiment: LoopX is set to BestX plus I times the StepSize, and LoopY is set to BestY plus J times the StepSize. After LoopX and LoopY are calculated, they are converted to a physical coordinate (LoopY, LoopX), and the cancellers and phase are set up. Then, with these values in place, the residual power (pow) is calculated.

In operation 708, it is determined whether the residual power (pow) calculated in operation 706 is less than the min_pow. If so, then the method 700 continues to operation 710. Otherwise, the process returns to operation 706 to further refine the solution.

In operation 710, BestX is set to I and BestY is set to J. This is a replacement operation which sets the possible solution to the values previously calculated in the process, as BestX and BestY are set to the best values during each sweep.

In operation 712, J is incremented by one, and it is determined whether the resultant J value is less than 1. If it is, the method 700 continues to operation 714, otherwise, it returns to operation 706 to further refine the solution.

In operation 714, I is incremented by one, and it is determined whether the resultant I value is less than 1. If it is, the method 700 continues to operation 716, otherwise, it returns to operation 706 to further refine the solution.

The comparison operations 712 and 714 can be executed in any desired order.

In operation 716, the StepSize is reduced by half, and LoopX is set to BestX, while LoopY is set to BestY.

In operation 718, it is determined whether the StepSize is less than 1. If it is, then the method 700 continues to operation 720, otherwise the method returns to operation 704 to restart with a reduced StepSize and new starting values for LoopY and LoopX.

In operation 720, the optimum solution is determined to be the resultant BestY and BestX, represented as coordinates (BestY, BestX).

Delay Matching to Mitigate Local Oscillator Phase Noise

RFID readers using both monostatic and bistatic antennas are subjected to a situation where the reader's input signal includes some amount of leakage (small or large) from the transmitted carrier, some backscattered carrier signal from the RFID tag and various objects in the physical environment, and backscatter sidebands created by the RFID tag. These backscattered sidebands, in some approaches, may be detected by mixing the incoming signal with the carrier signal. The result of this mixing operation (technically, a multiplication) is that all of the RF carrier signals produce a purely direct current (DC) output from the mixer, while only the sidebands produce alternating current (AC) signals, at the backscatter link frequency. Thus, by using AC coupling at the mixer's output, all of the incoming signals are rejected, except the backscatter sidebands, in one embodiment. Accordingly, the much larger carrier signal can be successfully separated from the sidebands.

Now referring to FIG. 3, ordinarily, any noise in the sidebands which accompany the transmitter signal survive the AC coupling strategy and compete with the desired backscatter sidebands. If these transmitter noise sidebands are sufficiently strong, they mask the much weaker backscatter sidebands and prevent their detection. One potentially significant type of transmitter noise is the reader carrier's phase noise.

This noise includes random phase modulation which originates in the RF source 320 that creates the transmitted carrier. Fortunately, since this phase noise exists on both the RF source 320 which drives the mixer 322 and the transmitted carrier which leaks into the receiver, the multiplication process, in one embodiment, produces a comprehensive cancellation of this noise in the output of the mixer 322, i.e., the phase noise sidebands, when mixed with themselves, also produce a DC output, which is rejected by the AC coupling in the output of the mixer 322. This cancellation depends upon the sidebands being identical on both inputs of the mixer 322 (from the RF bandpass filter 308 and from the RF source 320), in one approach. If they are not, the cancellation is degraded, and the noise reappears at the baseband output of the mixer 322.

Typically, these phase noise sidebands are not quite identical, as they are differentiated in the reader circuit by the RF bandpass filter 308 which precedes one of the inputs of the mixer 322. This RF bandpass filter 308 has the effect of delaying the phase noise sidebands which return from the antenna 310, relative to the phase noise sidebands which directly drive the mixer 322 from the RF source 320, e.g., there is a delay between the outputs of the RF bandpass filter 308 and the RF source 320. The strength of the surviving noise at the output of the mixer 322 is proportional to the group delay in this RF bandpass filter 308.

The RF bandpass filter 308, which might be placed either before or after the low noise amplifier 304 (it is shown after the low noise amplifier 304 in FIG. 3), serves the purpose of protecting the receiver by rejecting large out-of-band interfering signals, such as cell phone signals. Consequently, the frequency response of the RF bandpass filter 308 must purposely be as narrow as possible, preferably covering just the RFID band, to minimize the reader's vulnerability to these interfering signals. Narrow filters with deep skirts are unalterably associated with large group delays, which exacerbate the receiver's susceptibility to its local oscillator's phase noise.

Figure 4C:
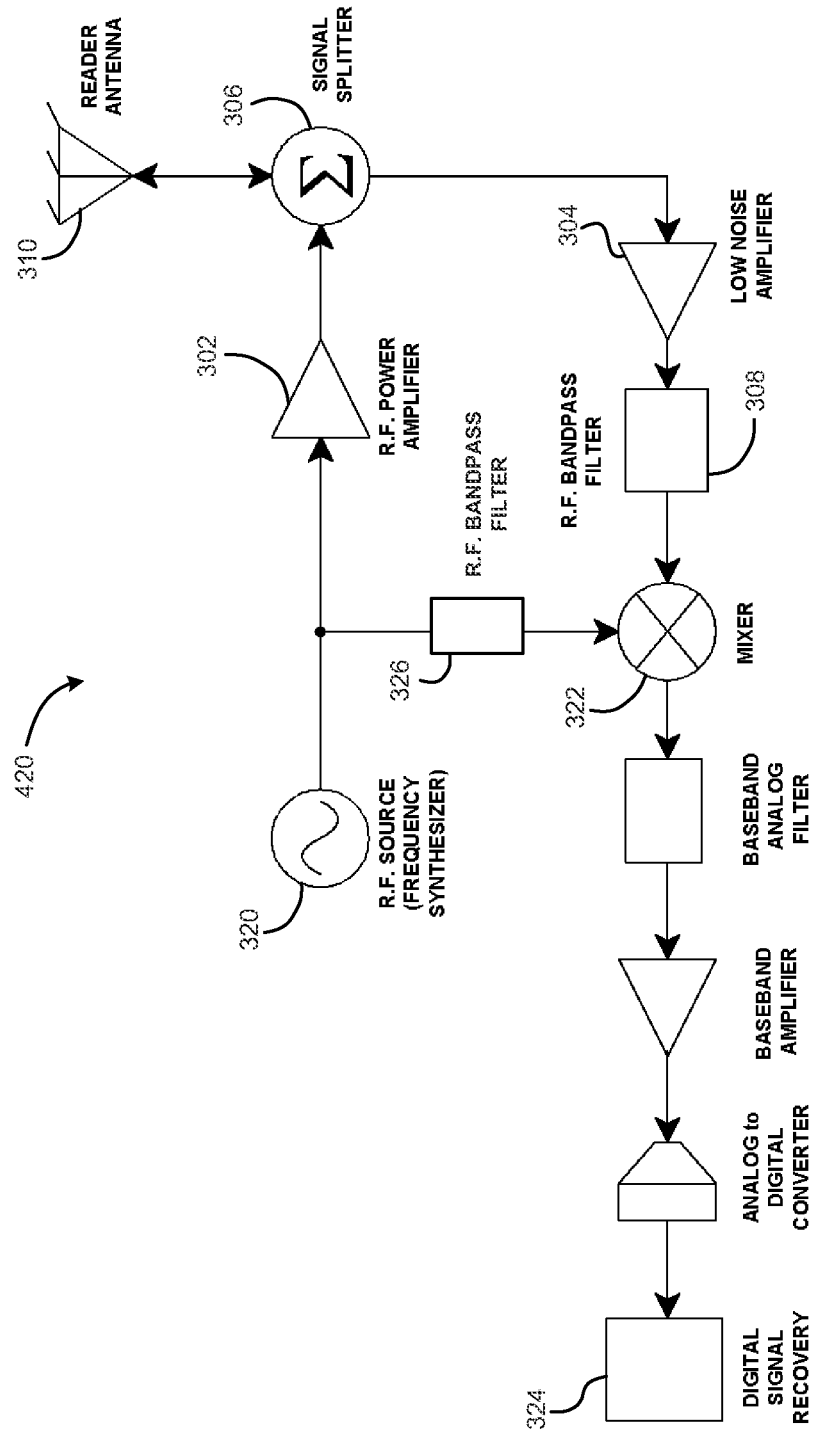
FIG. 4C is a partial block diagram of a RFID reader circuit according to another embodiment.

Now referring to FIG. 4C, according to one embodiment, a solution to this dilemma may be accomplished by placing another, identical RF bandpass filter 326 in the path between the RF source 320 and the mixer 322. The mixer input signals (from the RF bandpass filters 308, 326) are delayed by the same amount as the transmitter leakage returning from the antenna 310, thereby rendering the delay nearly identical once again and restoring the cancellation efficacy, according to one approach. As shown in FIG. 4C, this embodiment is a monostatic antenna 310 configuration.

Figure 4D:
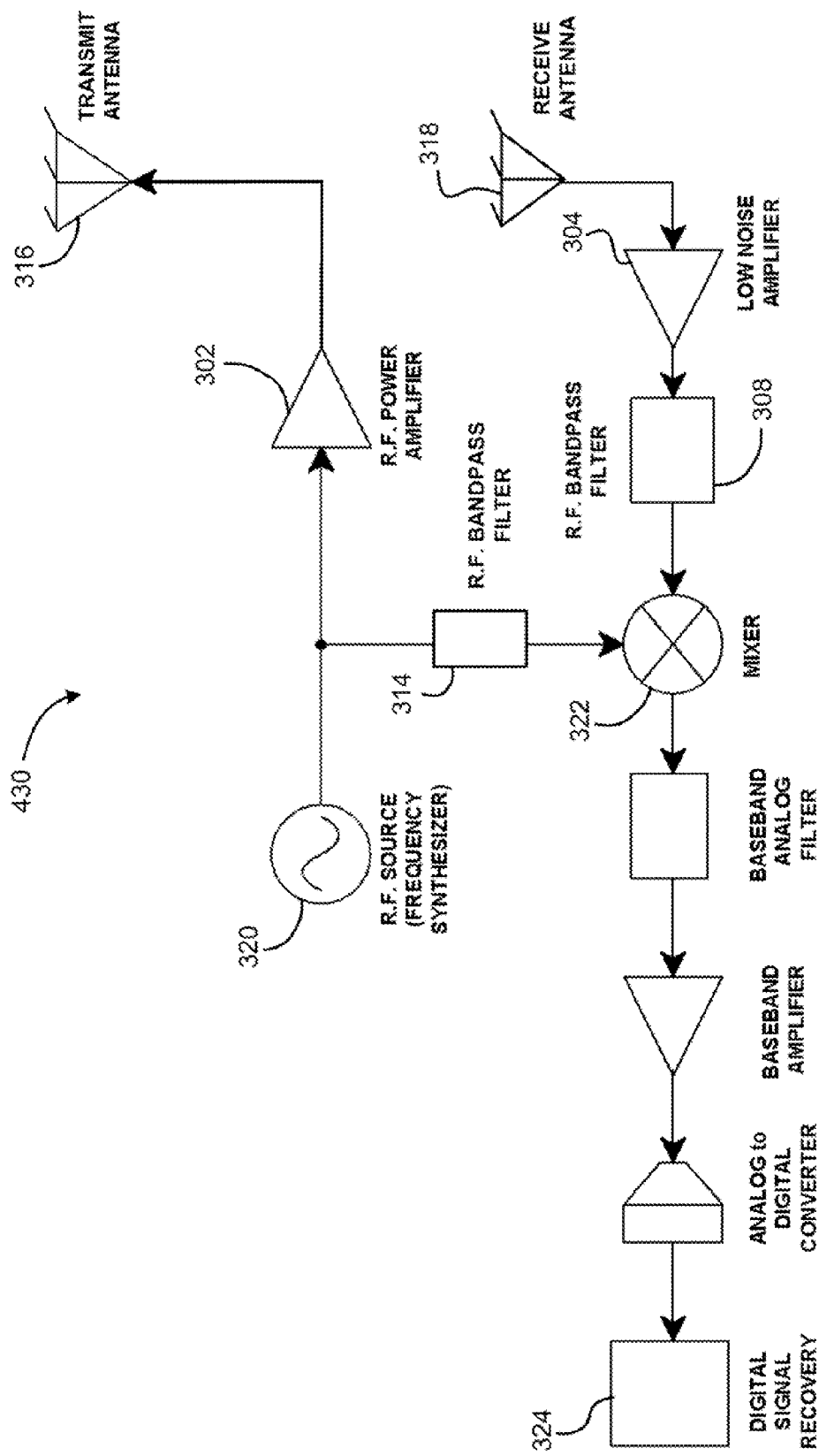
FIG. 4D is a partial block diagram of a RFID reader circuit according to another embodiment.

To alleviate the offset in bistatic antenna designs, as shown in FIG. 4D, another, identical RF bandpass filter 326 may be positioned in the path between the RF source 320 and the mixer 322. The mixer input signals (from the RF bandpass filters 308, 326) are delayed by the same amount as the transmitter leakage coming from the receive antenna 318, thereby rendering the delay nearly identical once again and restoring the cancellation efficacy, according to one approach.

RF Modulator Noise

According to some conventional RFID reader circuits, because a RFID reader is transmitting a signal while simultaneously trying to receive the backscattered sidebands from the RFID tag, any noise on the transmitter signal tends to mask the much weaker received sidebands. This noise masking is particularly onerous in RFID readers which use a monostatic antenna design, as shown in FIGS. 3, 4A and 4C, according to some embodiments, where the transmitter signals exist simultaneously with the backscattered sidebands in the very same antenna 310.

Figure 8A:
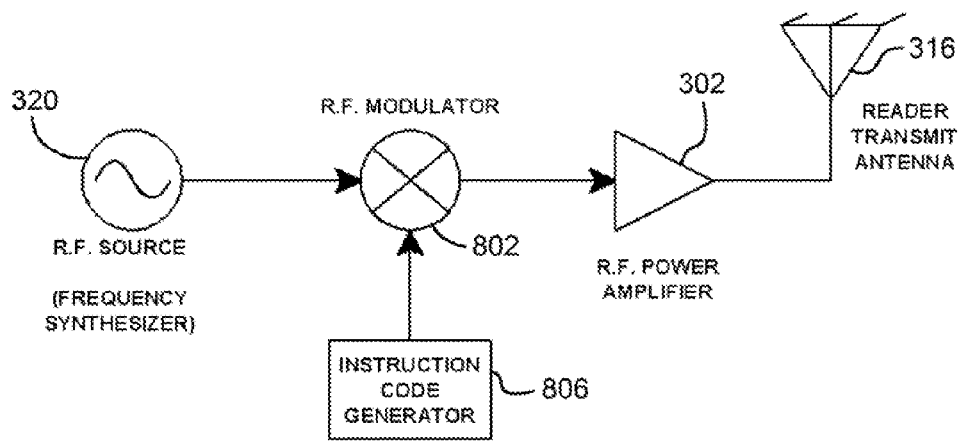
FIG. 8A is a partial block diagram of a RFID reader circuit according to one embodiment.
Figure 8B:
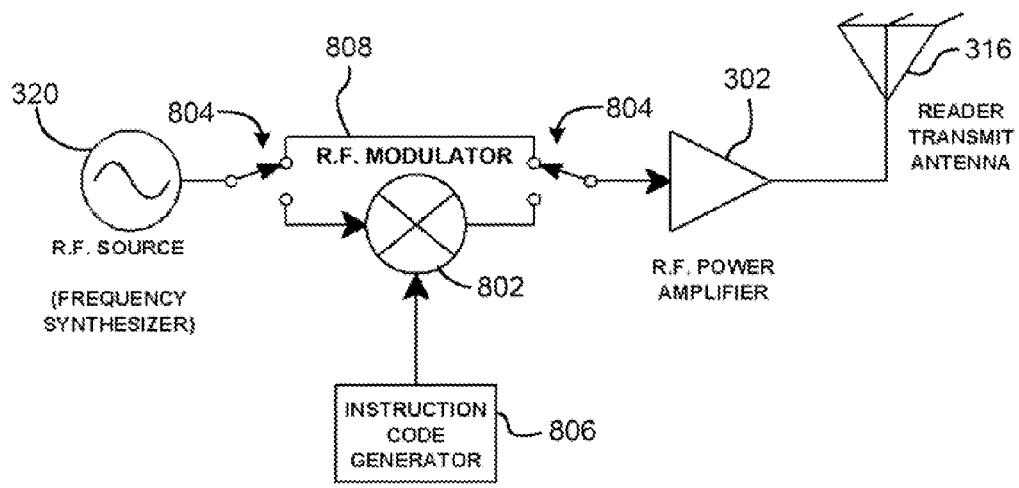
FIG. 8B is a partial block diagram of a RFID reader circuit according to another embodiment.
Figure 8C:
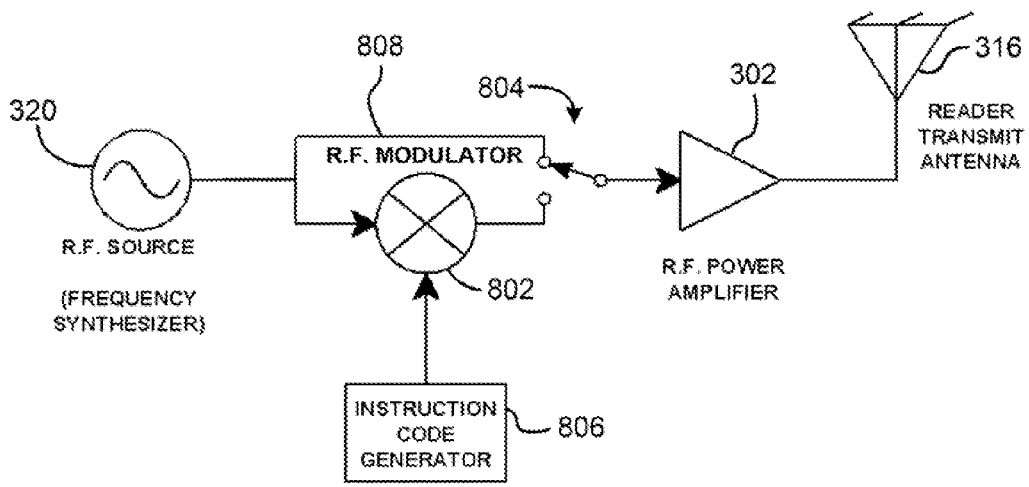
FIG. 8C is a partial block diagram of a RFID reader circuit according to another embodiment.

As shown in FIGS. 8A-8C, one primary source of this noise is the transmitter's RF modulator 802, which precedes the RF power amplifier 302 according to various embodiments. The RF modulator 802 is used during the reader's 'write' cycle, during which the RFID reader's transmitted carrier signal is modulated with instruction codes from an instruction code generator 806, according to one approach, directing the RFID tag's activities in a future 'read' cycle.

The transmit signal originates in the RF source 320 as a pure, low-level, unmodulated carrier wave. During the 'write' cycle, the RF Modulator 802 alters the amplitude and/or phase of the RF source signal, in some embodiments, which action imposes the instruction codes upon the carrier signal. The RF power amplifier 302 then greatly increases the strength of this modulated carrier signal, and delivers the final transmit signal to the reader's transmit antenna 316. (A bistatic implementation is shown in FIGS. 8A-8C; however, the descriptions provided herein are equally applicable to a monostatic antenna 310, such as those shown in FIGS. 4A and 4C, in additional embodiments). Referring again to FIGS. 8A-8C, during the 'read' phase, modulation is undesired, so the instruction code generator 806 is shut down, and no modulation of the RF source 320 occurs. Thus, during the 'read' cycle, only the pure carrier from the RF source 320 is amplified and delivered to the antenna 316.

However, the RF modulator 802 continues to introduce noise into the transmit path. During the 'read' cycle, any noise, e.g., thermal noise, shot noise, etc., which originates within the RF modulator 802 will experience the full amplification of the RF power amplifier 302, and will emerge along with the modulated carrier signal. This noise acts to mask the backscattered sidebands created by the switching action in the RFID tag. Therefore, by effectively removing the RF modulator 802 output from the reader circuit during the 'read' cycle, such as with one or more switches 804, the attendant noise from the RF modulator 802 will be removed as well.

As shown in FIG. 8B, according to one embodiment, a switch 804 may be positioned before and a switch 804 may be positioned after the RF modulator 802, such that the RF modulator 802 may be removed from the reader circuit when desired, such as during the 'read' cycle, thereby removing the attendant noise as well.

In an alternate embodiment, as shown in FIG. 8C, since the noise originates at the RF modulator 802 output, one switch 804 separating the RF modulator 802 from the transmit channel also can eliminate the noise created by the RF modulator 802.

Illustrative Embodiments

Referring again to FIGS. 8A-8C and FIGS. 9A-9B, a RFID reader circuit 900, 910, according to various embodiments, includes a RF source 320 input in a transmitting path (from the RF source 320 to the reader antenna 310 or transmit antenna 316, depending on whether the RFID circuit is monostatic or bistatic, according to several approaches), a RF modulator 802 in parallel with a bypass 808, the RF modulator 802 and the bypass 808 being selectively coupled to the RF source 320 input, at least one switch 804 for selectively coupling an output of the RF modulator 802 to the transmitting path, and a RF power amplifier 302 in the transmitting path.

Figure 9A:
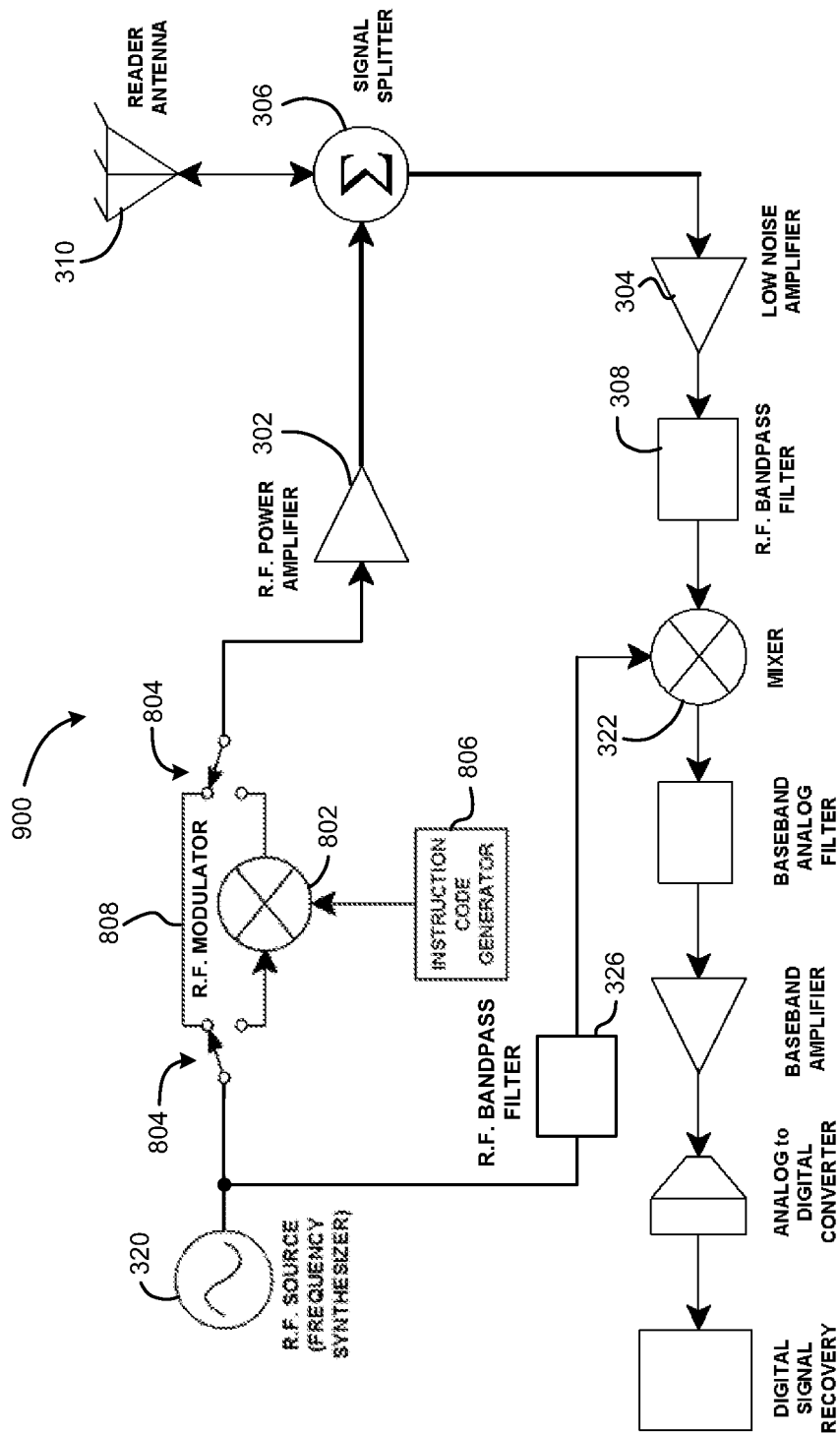
FIG. 9A is a partial block diagram of a RFID reader circuit according to one embodiment.

According to one embodiment, the RFID reader circuit 900 may be adapted for monostatic operation, as shown in FIG. 9A. In an alternative embodiment, the RFID reader circuit 910 may be adapted for bistatic operation, as shown in FIG. 9B.

In the monostatic embodiment, the RFID circuit 900 may also include a signal splitter module 306 coupled to a reader antenna lead (for coupling to a reader antenna 310 or receive antenna 318, in some approaches), and a low noise amplifier 304 in a receiving path (from the reader antenna 310 or receive antenna 318 to the digital signal recovery module 324, depending on whether the RFID circuit is monostatic 900 or bistatic 910, according to several approaches). An input of the signal splitter module 306 is coupled to an output of the RF power amplifier 302, an output of the signal splitter module 306 is coupled to an input of the low noise amplifier 304, and the reader antenna lead is for coupling to a reader antenna 310 capable of sending and receiving signals, in several embodiments.

The RFID reader circuit 900 may also include a first RF bandpass filter 326 coupled between the RF source 320 input and a mixer module 322, and a second RF bandpass filter 308 coupled between the reader antenna lead and the mixer module 322. The mixer module 322 multiplies a first signal from the first RF bandpass filter 326 with a second signal from the second RF bandpass filter 308 to recover the backscatter sidebands in the second signal.

Figure 9B:
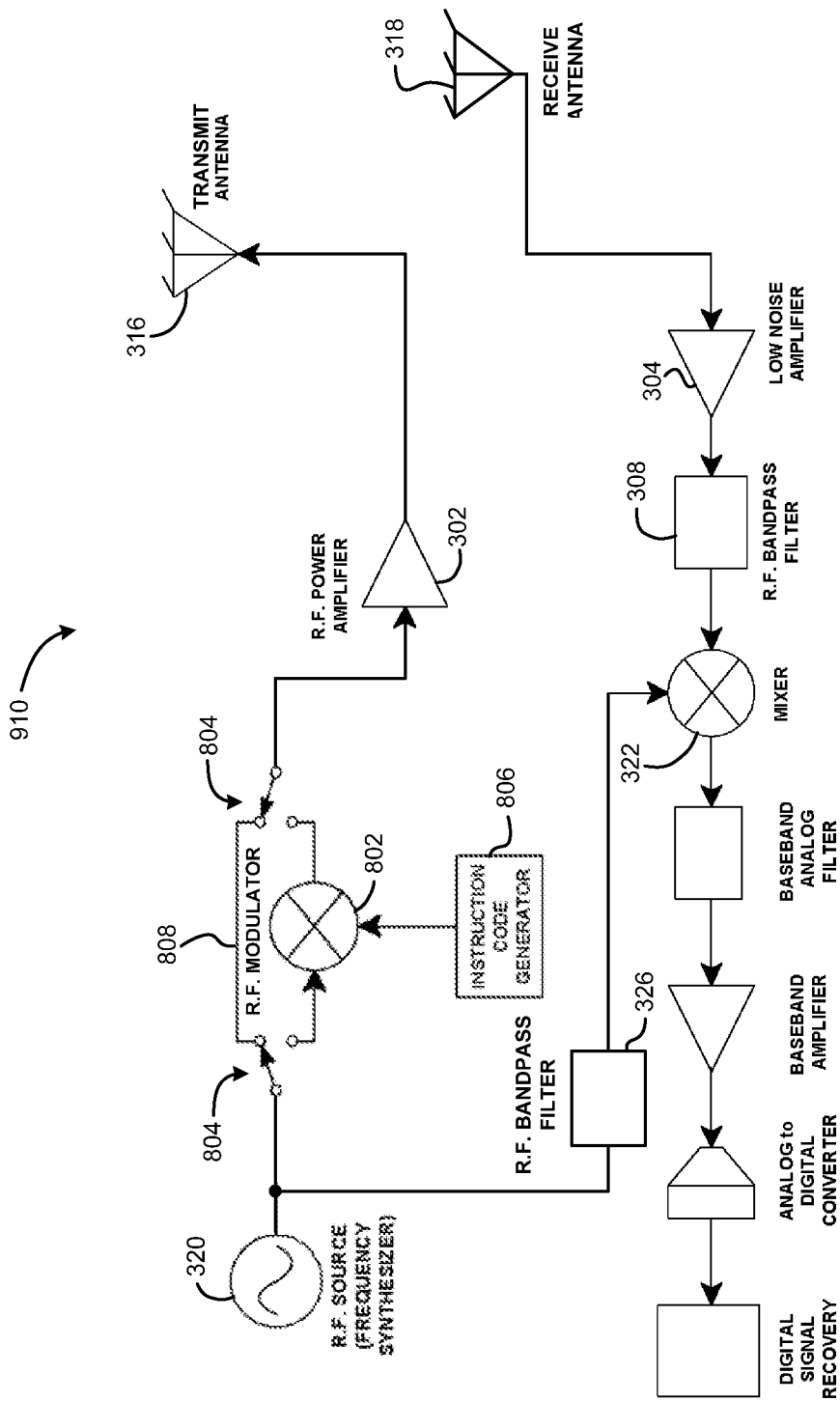
FIG. 9B is a partial block diagram of a RFID reader circuit according to another embodiment.

In another embodiment, the reader circuit 910 may be adapted for bistatic operation, as shown in FIG. 9B. In this embodiment, the reader circuit may also include a transmit antenna lead in the transmitting path for coupling to a transmit antenna 316 capable of sending signals, and a receive antenna lead in a receiving path for coupling to a receive antenna 318 capable of receiving signals. Further, in some approaches, the reader circuit 910 may also include a first RF bandpass filter 326 coupled between the RF source 320 input and a mixer module 322, and a second RF bandpass filter 308 in the receiving path coupled between the output of the receive antenna lead and the mixer module 322. The mixer module 322 may multiply a first signal from the first RF bandpass filter 326 with a second signal from the second RF bandpass filter 308 to recover the backscatter sidebands in the second signal.

In some embodiments, the at least one switch 804 may be coupled to an output of the RF modulator 802. In another embodiment, one switch 804 may be coupled to an output of the RF modulator 802 and another switch 804 may be coupled to an input of the RF modulator 802.

In some preferred embodiments, the RF modulator 802 output may be coupled during transmitting operations.

In some more preferred embodiments, the RF modulator 802 output may be decoupled during receiving operations, in order to remove noise from the reader circuit.

According to another embodiment, referring again to FIGS. 1, 8A-8C, and 9A-9B, a RFID system includes a plurality of RFID tags 102 and at least one RFID reader 104, the at least one RFID reader 104 comprising a RFID reader circuit 900, 910. The reader circuit includes a RF source 320 input in a transmitting path (from the RF source 320 to the reader antenna 310 or transmit antenna 316, depending on whether the RFID circuit is monostatic or bistatic, according to several approaches), a RF modulator 802 in parallel with a bypass 808, the RF modulator 802 and the bypass 808 being selectively coupled to the RF source 320 input, at least one switch 804 for selectively coupling an output of the RF modulator 802 to the transmitting path, and a RF power amplifier 302 in the transmitting path According to one embodiment, the RFID reader circuit 900 may be adapted for monostatic operation, as shown in FIG. 9A. In an alternative embodiment, the RFID reader circuit 910 may be adapted for bistatic operation, as shown in FIG. 9B.

In the monostatic embodiment, the RFID circuit 900 may also include a signal splitter module 306 coupled to a reader antenna lead (for coupling to a reader antenna 310 or receive antenna 318, in some approaches), and a low noise amplifier 304 in a receiving path (from the reader antenna 310 or receive antenna 318 to the digital signal recovery module 324, depending on whether the RFID circuit is monostatic 900 or bistatic 910, according to several approaches). An input of the signal splitter module 306 is coupled to an output of the RF power amplifier 302, an output of the signal splitter module 306 is coupled to an input of the low noise amplifier 304, and the reader antenna lead is for coupling to a reader antenna 310 capable of sending and receiving signals, in several embodiments.

The RFID reader circuit 900 may also include a first RF bandpass filter 326 coupled between the RF source 320 input and a mixer module 322, and a second RF bandpass filter 308 coupled between the reader antenna lead and the mixer module 322. The mixer module 322 multiplies a first signal from the first RF bandpass filter 326 with a second signal from the second RF bandpass filter 308 to recover the backscatter sidebands in the second signal.

In another embodiment, the reader circuit 910 may be adapted for bistatic operation, as shown in FIG. 9B. In this embodiment, the reader circuit may also include a transmit antenna lead in the transmitting path for coupling to a transmit antenna 316 capable of sending signals, and a receive antenna lead in a receiving path for coupling to a receive antenna 318 capable of receiving signals. Further, in some approaches, the reader circuit 910 may also include a first RF bandpass filter 326 coupled between the RF source 320 input and a mixer module 322, and a second RF bandpass filter 308 in the receiving path coupled between the output of the receive antenna lead and the mixer module 322. The mixer module 322 may multiply a first signal from the first RF bandpass filter 326 with a second signal from the second RF bandpass filter 308 to recover the backscatter sidebands in the second signal.

In some embodiments, the at least one switch 804 may be coupled to an output of the RF modulator 802. In another embodiment, one switch 804 may be coupled to an output of the RF modulator 802 and another switch 804 may be coupled to an input of the RF modulator 802.

In some preferred embodiments, the RF modulator 802 output may be coupled during transmitting operations.

In some more preferred embodiments, the RF modulator 802 output may be decoupled during receiving operations, in order to remove noise from the reader circuit.

In another embodiment, a method for cancelling noise in a RFID reader circuit is described. The method may be executed in any desired environment, included those described herein in FIGS. 1-9B, among others. The method includes decoupling a RF modulator 802 output from a transmitting path of a RFID reader circuit 900, 910 during receiving operations, in order to remove noise associated with the RF modulator 802 from the reader circuit 900, 910.

Referring again to FIGS. 8A-8C and 9A-9B, a RFID reader circuit 900, 910 includes a RF source 320 in a transmitting path (from the RF source 320 to the reader antenna 310 or transmit antenna 316, depending on whether the RFID circuit is monostatic or bistatic, according to several approaches), a RF power amplifier 302 in the transmitting path, a low noise amplifier 304 in a receiving path (from the reader antenna 310 or receive antenna 318 to the digital signal recovery module 324, depending on whether the RFID circuit is monostatic 900 or bistatic 910, according to several approaches), a first RF bandpass filter 326 coupled between the RF source 320 and a mixer module 322, a second RF bandpass filter 308 in the receiving path coupled to the mixer module 322, a RF modulator 802 selectively coupled to the RF source 320, and a switch 804 in series with the RF modulator 802 for selectively coupling a RF modulator 802 output to the transmitting path. The mixer module 322 multiplies a first signal from the first RF bandpass filter 326 with a second signal from the second RF bandpass filter 308 to recover the backscatter sidebands in the second signal.

Any of the various embodiments described above in regard to the other RFID reader circuit embodiments may be applied to this embodiment as well.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A Radio Frequency Identification (RFID) reader circuit, the reader circuit comprising:
   a Radio Frequency (RF) source input in a transmitting path, the RF source generating a carrier wave;
   a RF modulator in parallel with a bypass;
   at least one switch for selectively coupling an output of the RF modulator to the transmitting path or an output of the bypass to the transmitting path; and
   a RF power amplifier in the transmitting path;
   a low noise amplifier in the receiving path; and
   a first RF bandpass filter in a signal path between the RF source input and a mixer module,
   wherein an output of the RF source is coupled to the RF power amplifier when the switch couples the output of the RF modulator to the transmitting path,
   wherein an output of the RF modulator is coupled to the RF power amplifier when the switch couples the output of the RF modulator to the transmitting path,
   wherein the mixer module multiplies a first signal from the first RF bandpass filter with a second signal from the receiving path to recover backscatter sidebands in the second signal.

2. The RFID reader circuit of claim 1, wherein an output of the RF source is an input to the first RF bandpass filter.

3. The RFID reader circuit of claim 1, comprising:
   a signal splitter module coupled to a reader antenna lead; and
   wherein an input of the signal splitter module is coupled to an output of the RF power amplifier,
   wherein an output of the signal splitter module is coupled to an input of the low noise amplifier, and
   wherein the reader antenna lead is for coupling to a reader antenna capable of sending and receiving signals.

4. The RFID reader circuit of claim 3, further comprising:
   a second RF bandpass filter in the receiving path, the second RF bandpass filter being coupled between the reader antenna lead and the mixer module.

5. The RFID reader circuit of claim 1, wherein the reader circuit is adapted for bistatic operation.

6. The RFID reader circuit of claim 5, further comprising:
   a transmit antenna lead in the transmitting path for coupling to a transmit antenna capable of sending signals; and
   a receive antenna lead in a receiving path for coupling to a receive antenna capable of receiving signals.

7. The RFID reader circuit of claim 6, further comprising:
   a first RF bandpass filter coupled between the RF source input and a mixer module; and
   a second RF bandpass filter in the receiving path coupled between the output of the receive antenna lead and the mixer module,
   wherein the mixer module multiplies a first signal from the first RF bandpass filter with a second signal from the second RF bandpass filter to recover backscatter sidebands in the second signal.

8. The RFID reader circuit of claim 1, wherein the at least one switch is coupled to an output of the RF modulator.

9. The RFID reader circuit of claim 1, wherein one switch is coupled to an output of the RF modulator and one switch is coupled to an input of the RF modulator.

10. The RFID reader circuit of claim 1, wherein the RF modulator and the bypass are always coupled to the RF source output.

11. The RFID reader circuit of claim 1, wherein the RF modulator output is decoupled during receiving operations.

12. A Radio Frequency Identification (RFID) system, the system comprising:
    at least one RFID reader, the at least one RFID reader comprising a RFID reader circuit, the circuit comprising:
    a Radio Frequency (RF) source input in a transmitting path, the RF source generating a carrier wave;
    a RF modulator in parallel with a bypass, the RF modulator and the bypass being selectively coupled to the RF source input;
    at least one switch for selectively coupling an output of the RF modulator to the transmitting path; and
    a RF power amplifier in the transmitting path; a low noise amplifier in the receiving path; and
    a first RF bandpass filter in a signal path between the RF source input and a mixer module,
    wherein an input of the signal splitter module is coupled to an output of the RF power amplifier,
    wherein an output of e signal splitter module is coupled to an input of the low noise amplifier, and
    wherein the reader antenna lead is for coupling to a reader antenna capable of sending and receiving signals.

13. The RFID system of claim 12, wherein an output of the RF source is an input to the first RF bandpass filter.

14. The RFID system of claim 12, wherein the RFID reader circuit further comprises:
    a signal splitter module coupled to a reader antenna lead.

15. The RFID system of claim 14, wherein the RFID reader circuit further comprises:
    a first RF bandpass filter coupled between the RF source input and a mixer module; and
    a second RF bandpass coupled between the reader antenna lead and the mixer module,
    wherein the mixer module multiplies a first signal from the first RF bandpass filter with a second signal from the second RF bandpass filter to cancel noise in the second signal.

16. The RFID system of claim 12, wherein the reader circuit is adapted for bistatic operation.

17. The RFID system of claim 16, wherein the RFID reader circuit further comprises:
    a transmit antenna lead in the transmitting path for coupling to a transmit antenna capable of sending signals; and
    a receive antenna lead in a receiving path for coupling to a receive antenna capable of receiving signals.

18. The RFID system of claim 17, wherein the RFID reader circuit further comprises:
- a first RF bandpass filter coupled between the RF source input and a mixer module; and
- a second RF bandpass filter in the receiving path coupled between the output of the receive antenna lead and the mixer module,
- wherein the mixer module multiplies a first signal from the first RF bandpass filter with a second signal from the second RF bandpass filter to recover backscatter sidebands in the second signal.

19. The RFID system of claim 12, wherein the at least one switch is coupled to an output of the RF modulator.

20. The RFID system of claim 12, wherein one switch is coupled to an output of the RF modulator and one switch is coupled to an input of the RF modulator.

21. The RFID system of claim 12, wherein the RF modulator output is coupled during transmitting operations.

22. The RFID system of claim 12, wherein the RF modulator output is decoupled during receiving operations.

23. A method for reducing noise in a Radio Frequency Identification (RFID) reader circuit as recited in claim 1, the method comprising decoupling a RF modulator output from a transmitting path of a RFID reader circuit during receiving operations.

24. A Radio Frequency Identification (RFID) reader circuit, the reader circuit comprising:
- a Radio Frequency (RF) source in a transmitting path;
- a RF power amplifier in the transmitting path;
- a low noise amplifier in a receiving path;
- a first RF bandpass filter coupled between the RF source and a mixer module;
- a second RF bandpass filter in the receiving path coupled to the mixer module;
- a RF modulator selectively coupled to the RF source; and
- a switch in series with the RF modulator for selectively coupling a RF modulator output to the transmitting path,
- wherein the mixer module multiplies a first signal from the first RF bandpass filter with a second signal from the second RF bandpass filter to recover backscatter sidebands in the second signal.

25. The RFID reader circuit of claim 24, wherein an output of the RF source is an input to the first RF bandpass filter.

26. The RFID reader circuit of claim 24, further comprising:
- a signal splitter module coupled to a reader antenna lead,
- wherein an input of the signal splitter module is coupled to an output of the RF power amplifier,
- wherein an output of the signal splitter module is coupled to an input of the low noise amplifier, and
- wherein the reader antenna lead is for coupling to a reader antenna capable of sending and receiving signals.

27. The RFID reader circuit of claim 24, wherein the reader circuit is adapted for bistatic operation.

28. The RFID reader circuit of claim 27, further comprising:
- a transmit antenna lead in the transmitting path for coupling to a transmit antenna capable of sending signals; and
- a receive antenna lead in a receiving path for coupling to a receive antenna capable of receiving signals.

29. The RFID reader circuit of claim 24, further comprising a switch coupled to an input of the RF modulator for selectively coupling the RF modulator to the transmitting path.

30. The RFID reader circuit of claim 24, wherein the RF modulator output is coupled during transmitting operations.

31. The RFID reader circuit of claim 24, wherein the RF modulator output is decoupled during receiving operations.

* * * * *